United States Patent [19]

Beam

[11] Patent Number: 5,442,518
[45] Date of Patent: Aug. 15, 1995

[54] WIRING SYSTEM FOR VEHICLE INSTRUMENT PANEL WIRE ENCAPSULATED IN RECONFIGURED VENTILATION SYSTEM

[75] Inventor: William M. Beam, Rochester Hills, Mich.

[73] Assignee: Chrysler Corporation, Highland Park, Mich.

[21] Appl. No.: 271,225

[22] Filed: Jul. 6, 1994

Related U.S. Application Data

[63] Continuation of Ser. No. 989,867, Dec. 14, 1992, abandoned.

[51] Int. Cl.⁶ ............................................. H05K 7/20
[52] U.S. Cl. .................................... 361/690; 138/103; 174/47; 174/72 A; 307/10.1; 361/826
[58] Field of Search ............... 361/627, 689, 690, 694, 361/695, 807, 809, 810, 826, 827; 165/80.3; 307/10.1, 147, 148; 248/27.1; 174/72 A, 99 R, 47, 48; 454/152; 62/244; 138/103, 108

[56] References Cited

U.S. PATENT DOCUMENTS

| 2,896,213 | 7/1959 | Alderman et al. ................ 1/102 |
| 3,393,350 | 7/1968 | Goudy ............................. 361/346 |
| 3,710,480 | 1/1973 | Royse et al. .................... 29/203 |
| 3,724,357 | 4/1973 | Kavthekar ...................... 62/244 |
| 3,956,822 | 5/1976 | Folk ................................ 29/628 |
| 4,189,619 | 2/1980 | Pedlow .......................... 174/48 |
| 4,210,773 | 7/1980 | Haley et al. . | |
| 4,255,610 | 3/1981 | Textoris ......................... 174/48 |
| 4,271,573 | 6/1981 | von Roesgen ................. 29/33 M |
| 4,461,061 | 7/1984 | Rock .............................. 29/33 M |
| 4,522,114 | 6/1985 | Matsuno ....................... 98/2.09 |
| 4,703,543 | 11/1987 | Aceti et al. .................. 29/33 M |
| 4,750,265 | 6/1988 | Watanabe ...................... 29/854 |
| 4,820,189 | 4/1989 | Sergeant ........................ 439/395 |
| 4,824,164 | 4/1989 | Nakayama et al. . | |
| 4,942,499 | 7/1990 | Shibata .......................... 361/428 |
| 4,943,241 | 7/1990 | Watanabe ....................... 439/34 |
| 5,297,334 | 3/1994 | Johnson ......................... 29/861 |

FOREIGN PATENT DOCUMENTS

3820724A1 6/1988 Germany .
2155120 6/1990 Japan .

Primary Examiner—Gerald P. Tolin
Attorney, Agent, or Firm—Christopher Taravella

[57] ABSTRACT

A wiring system for a vehicle instrument panel, which includes a plurality of electronic subassembly components electrically connected to at least one wire, is encapsulated in a reconfigured ventilation duct structure located to the rear of the instrument panel. The ventilation duct structure, which extends between the subassembly components, is reconfigured to have at least one trough formed in it. The at least one trough has a finite length in at least one axial direction with an open side extending substantially along the length, so that the at least one wire may be received within the trough. The at least one wire is connected to at least one of the subassembly components. Wire restraints restrain the wire within the at least one trough.

18 Claims, 2 Drawing Sheets

WIRING SYSTEM FOR VEHICLE INSTRUMENT PANEL WIRE ENCAPSULATED IN RECONFIGURED VENTILATION SYSTEM

CROSS REFERENCE TO RELATED APPLICATIONS

This is a continuation of copending application Ser. No. 07/989,867 filed on Dec. 14, 1992 which is now abandoned.

This application is related to U.S. application Ser. No. 07/989,867 entitled "Modular Wiring System for Automotive Instrument Panel Wire" filed Dec. 14, 1992, also to U.S. application Ser. No. 993,543 entitled "Automated Wiring Feeding, Terminating and Cutting Device" filed Dec. 21, 1992, and also to U.S. application Ser. No. 07/993,545 entitled "Automated Wire Feeding and Restraining", filed

FIELD OF THE INVENTION

This invention relates generally to a wiring system for a vehicle instrument panel, and more particularly to a wire restraining system in which wires for electronic subassembly components for instruments displayed on a dash board are encapsulated in a reconfigured ventilation system.

BACKGROUND OF THE INVENTION

A few years ago, the automotive industry began to reverse the trend, which it had begun almost twenty years before, of replacing dashboard gauges with small warning lights or so-called "idiot lights". In part this was due to the sophistication of electronic gauges. Electronics are now used in various subassembly components of the modern day vehicle instrument panel. Electronic modules are used as small on-board computers that monitor hundreds of inputs from various sensors on the vehicle. Many leads or wires are used to electrically convey information from sensors at the sources of the information to the electronic gauges, through relays monitored by the modules. Other electronic subassemblies, such as radios, message centers, power antennae relays, intermittent windshield wiper controls, electronic air conditioning switches and relays, and other subassembly components are also interconnected by leads and wiring to electrical sources and sensors.

Because of the sheer number of electrically conductive wires used to electronically connect the subassembly components to each other and to other vehicle electrical components, wiring harnesses are typically used to arrange the conductive wires in groups. The wiring harnesses are attached to the instrument panel and routed along its substructure during assembly of the board or instrument ! panel. Wiring harnesses have the advantage of bringing some order to a spaghetti-like entanglement of wires, facilitating some tracing of the wires to allow for proper connections during assembly and to allow for trouble-shooting such connections for repair.

While wiring harnesses have advantages over loose arrays of wires that are difficult to trace, wiring harnesses also have shortcomings. Manually attaching and routing the wiring harnesses is a tedious and labor intensive task. Furthermore, owing in part to the tediousness and labor intensiveness of the task, manual manipulation of the wiring harnesses during assembly often results in damage to the instrument panel, to the subassembly components, and to the wires themselves. Because of the number of subassembly components that must be electrically interconnected, it is of limited advantage to systematize the deployment of wires simply by restraining wires as is done by using wiring harnesses.

For example, bunching a number of wires in a wiring harness does not help in allowing work operations to be performed upon the ends of the wires. This shortcoming can be appreciated by considering the teaching of U.S. Pat. No. 3,956,822, issued to Folk on May, 18, 1976. Folk discloses a method and apparatus for positioning lengths of individual leads of a plurality of leads in spaced-apart relationships with respect to one another, so that work operations can be simultaneously performed on the ends of the leads. The lengths of leads are positioned in a plurality of spaced-apart grooves of a template by progressively positioning successive parts of the lengths of each of the plurality of leads into respective grooves. Each groove is wider and deeper than the leads positioned within the groove. Each of the grooves has one or more spaced-apart lead confining means that retain segments of the leads positioned in the groove. The template with its grooves are only employed to perform the work operations on the ends of the leads. When the work operations are complete, knockout pins are associated with each of the spaced-apart lead retaining means to facilitate stripping the leads from the template. Accordingly, a wiring harness does not facilitate end operations of leads, such as the installation of terminals, As disclosed in the related U.S. patent application entitled "Wiring System for Automotive Instrument Panel Wire", cited in the Cross Reference to Related Applications section of this specification, a system of grooves or troughs as used in the present invention has advantages over both work templates and wiring harnesses.

OBJECTS OF THE INVENTION

Accordingly, it is an object of the present invention to provide an improved wiring system that has advantages over both work templates and wiring harnesses.

It is another object of this invention to provide an improved wiring system for a vehicle instrument panel that is capable of restraining a plurality of wires placed so that the wires are easily traceable for ease of assembly of subassembly components into the wiring system.

It is a further object of this invention to provide an improved restraining system without additional space and weight encumbering structure.

SUMMARY OF THE INVENTION

The instrument panel assembly of a vehicle includes a dashboard structure and a plurality of electrical assembly components associated with the instrumentation displayed on the dashboard. The subassembly components include electrical and electronic instruments, components, and assemblies that are mounted on or in proximity to the board structure. The subassembly components are interconnected and connected to other electrical and electronic components by a plurality of wires that are physically secured to the instrument panel assembly in the manner of the present invention that functions as a wire restraining system.

Included in the vehicle instrument assembly is a ventilation duct assembly attached to the dashboard structure. In accordance with the present invention, wires are encapsulated in the ventilation duct assembly, which is reconfigured from a more conventional ventilation duct assembly.

Wires are routed within a series of channels or troughs that are formed as part of the structure of the reconfigured ventilation duct assembly. Each trough is defined by a floor that extends along a longitudinal axis and two side walls that are spaced laterally and that extend perpendicularly to and outwardly from the floor. The "ceiling" of the trough, opposite the floor, is open.

Each trough may be traced along its longitudinal extent as it branches into other troughs or groups of troughs. Wires may be laid out to interconnect subassembly components as each trough opens into another trough or other troughs in which subassembly components are disposed. Each subassembly component is electrically attached to a connector, which is incorporated into the wiring system and which serves as the mating portion for a subassembly component. The mating portion of each connector is typically oriented to a docking station associated with the instrument panel assembly.

Each trough may contain one or several wires or as many as two-hundred wires. The size of a trough, particularly the width, depends on the number of wires to be placed in the trough. Each wire is individually a connecting part of a wiring circuit and is placed individually in the trough. Most wires originate from master connectors such as in left and right body wiring modules and extend to connectors mating with subassembly connectors, but wires may also extend from one connector to a subassembly component and then to another connector.

Each wire is restrained within the trough by restraining means. One restraining means is a lip structure extending from each side wall. Another is an adhesive that is used to attach a wire to the floor of a trough. Yet another comprises pairs of flexible clips that are mounted over the opening to the trough in spaced relationship to other pairs of flexible clips along the extension of each trough. All of the wire restraining means may be used together to restrain wire within a trough or one or more means may be sufficient to accomplish the same.

In accordance with the structure of the preferred embodiment of the present invention, the modified ventilation duct assembly functions as a wiring board, notwithstanding its primary function as ventilation duct work for the flow of air through ducts or air chambers into the vehicle.

DETAILED DESCRIPTION OF THE PREFERRED EMBODIMENT

Figure 1:
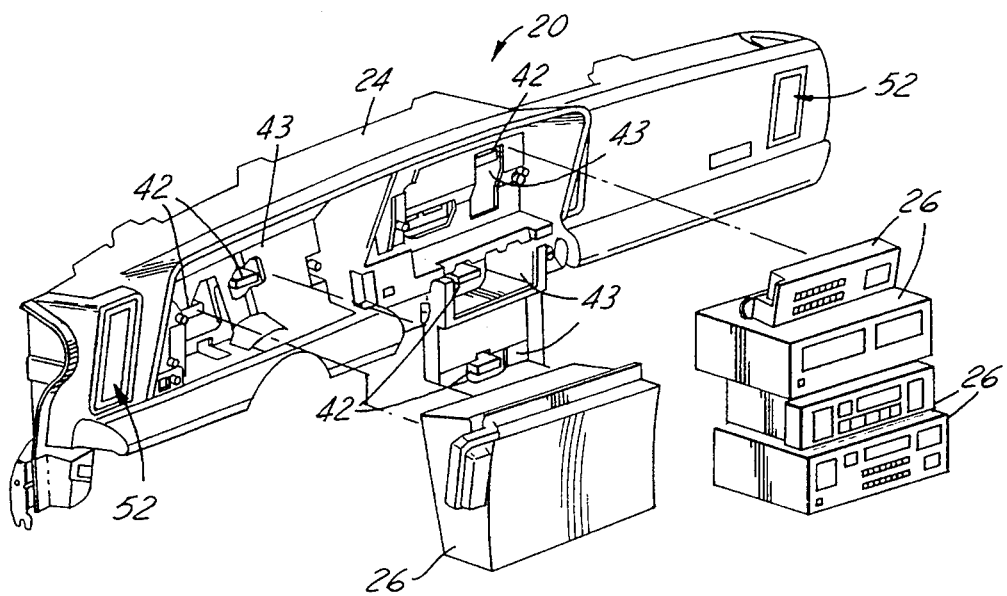
FIG. 1 is a perspective front view of a vehicle instrument panel incorporating the present invention.

Reference is now made to the drawings and, in particular, to FIG. 1, in which the front view of a vehicle instrument panel assembly 20 is seen. The instrument panel assembly 20 includes a plurality of electrical and electronic subassembly components 26 that are associated with the instrumentation displayed on the instrument panel or dashboard of a vehicle. The subassembly components 26 include such disparate electrical and electronic instruments, components, and assemblies as left and right modules that function as a small on-board computer, an electronic message center, a power antenna, and an intermittent windshield wiper control, an electronic air conditioning control, a radio and tape deck, an electronic voice alert, an illuminated entry relay, and other such gauges and switches known to those of ordinary skill in the automotive arts. The subassembly components 26 are mounted on or in proximity to the dashboard structure 24. The subassembly components 26 are each assembled to the instrument panel assembly 20 at associated docking stations 43. At each docking station 43, a subassembly component 26 is connected to a connector 42 as will be later explained.

Figure 2:
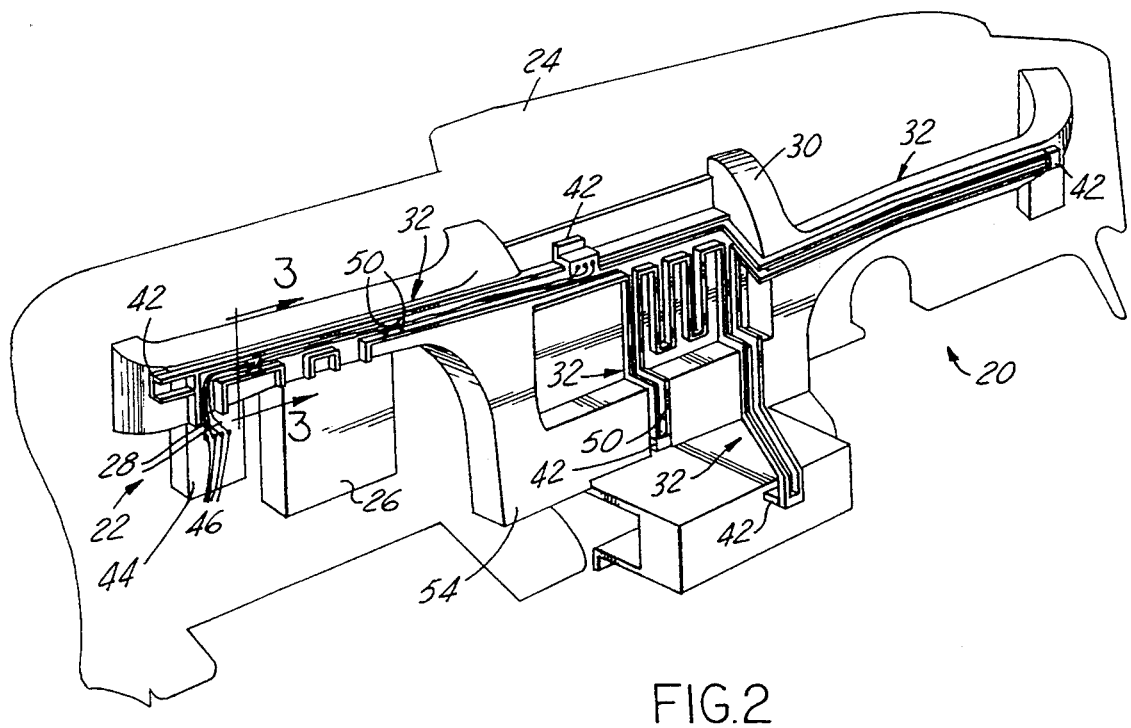
FIG. 2 is a perspective rear view of a vehicle instrument panel incorporating the present invention.

Referring now to FIG. 2, the rear of the vehicle instrument panel assembly 20 is seen. The rear of the vehicle instrument panel assembly 20 exposes a wire restraining system. 22. Instrument panel assembly 20 includes a dashboard structure 24 and a plurality of electrical assembly components 26 that are associated with the instrumentation displayed on the dashboard. The subassembly components 26 are interconnected and connected to other electrical and electronic components by a plurality of wires 28 that are physically secured to the instrument panel assembly 20, in the manner of the present invention.

The vehicle instrument assembly 20 is assembled with a ventilation duct assembly 30 attached to the dashboard structure 24. In accordance with the present invention, wires 28 are encapsulated in the ventilation duct assembly 30, which is reconfigured from a more conventional ventilation duct assembly, as will now be explained.

Figure 3:
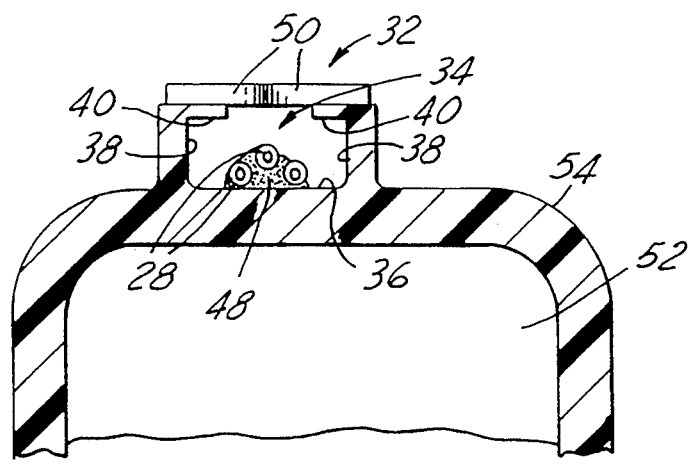
FIG. 3 is a fragmentary cross-sectional view of a wire restraining assembly taken substantially along line 3—3 of FIG. 2.

Referring still to FIG. 2, but now with the aid of FIG. 3, wires 28 are shown routed within a series of channels or troughs 32 that are formed as part of the structure of the reconfigured ventilation duct assembly 30. Each trough 32 is defined by a floor 36 extending along a longitudinal axis and two side walls 38 extending perpendicularly to and outwardly away from the floor 36. The side walls 38 are laterally spaced to define the width of the trough 32. Opposite the floor 36, in accordance with the trough 32, is an opening 34 to the trough 32. The opening 34, as it is defined, is characterized by the absence of a "ceiling" opposite the floor 36 and, accordingly, extends the length of the floor along its longitudinal axis. Opening 34 is bounded by the edges of the walls 38 disposed outwardly from the floor 36 or the inner most and outer most edges of lips 40, which will later be described as an optional feature of a means for restraining wires. 28 within trough 32.

Each trough 32 may be traced along its longitudinal extent to other troughs or groups of troughs. This allows for branching of troughs 32, so that wires 28 may be laid out to interconnect subassembly components 26 as each trough 32 opens into another trough or other troughs in which subassembly components 26 are disposed. Each subassembly component 26 is electrically attached to a connector 42 incorporated into the wiring system 22, in the manner disclosed in a related U.S. application identified in the beginning of the specification as "Wiring System for Automotive Instrument Panel Wire", cited in the Cross Reference to Related Applications section of this specification. Each connector 42 serves as the mating portion for a subassembly component 26. The connectors 42 are "floating connectors" known by those of ordinary skill in the art. The mating portion of each connector 42 is typically oriented to a docking station 43 of FIG. 1 associated with the instrument panel assembly 20 for ease of access and connection, again as disclosed in the related application. Thus, each trough 32 has a finite length and extends in a path in an axial direction and may extend into a plurality of branches of troughs 32, with each branch extending in a different axial direction depending on the location of the subassembly components 26 that are docked in the wiring system.

Each trough 32 may contain one or several wires 28 or as many as two-hundred wires 28. The size of a trough 32 may be different from another trough 32, depending on the number of wires 28 to be placed in the trough 32. Notwithstanding the number of wires 28 placed in each trough, each wire 28 is individually a connecting part of a wiring circuit and is placed individually in the wiring restraining system 32 in accordance with related U.S. patent application identified as "Automated Wire Feeding and Restraining" in the Related Patents section of this specification. In the preferred embodiment, most wires 28 originate from master connectors 44, known also as the "bulkhead connector" in a left body wiring module and a right body wiring module. The master connector 44 includes a plurality of terminals 46, each terminal 46 providing a electrical connection for a single wire 28, as is discussed in the related U.S. patent application entitled "Wiring System for Automotive Instrument Panel". Otherwise a wire 28 extends from a connector 42 of one subassembly component 26 to a connector 42 of another subassembly component 26.

Each wire 28 is restrained within the trough 32 by restraining means made up of a number of component parts, all of which are not necessarily required in a single embodiment of the present invention. One component of the restraining means is the lip structure 40 extending from each side wall 38. Each lip 40 extends from each side wall 38 inwardly toward the opposite side wall 38 over a portion of the top opening 34 to the trough 32. Lips 40 function as a part of a restraining means to restrain the wires 28 within the trough 32. It should be appreciated that lips 40 are optional and in some applications may not be preferred. For example, when unobstructed access to the floor of the trough 36 through the opening 34 is preferred.

Another component of the restraining means is an adhesive 48 that is used to attach a wire 28 to the floor 36 of a trough 32. The adhesive 48 may be placed on the wire 28 or floor 32 in a variety of ways, such as by spreading adhesive 48 by a brush or the like. A preferred means is by selectively spraying the adhesive 48 onto each wire 28 as the wire is placed in a trough 32. This method, which is disclosed in the related patent application referred to in the Related Patent Applications section of this specification above as "Automatic Feeding, Terminating and Cutting Device". By spraying each wire 28 with the adhesive 48, the wire is adhesively attached to floor 36 within trough 32.

Figure 4:
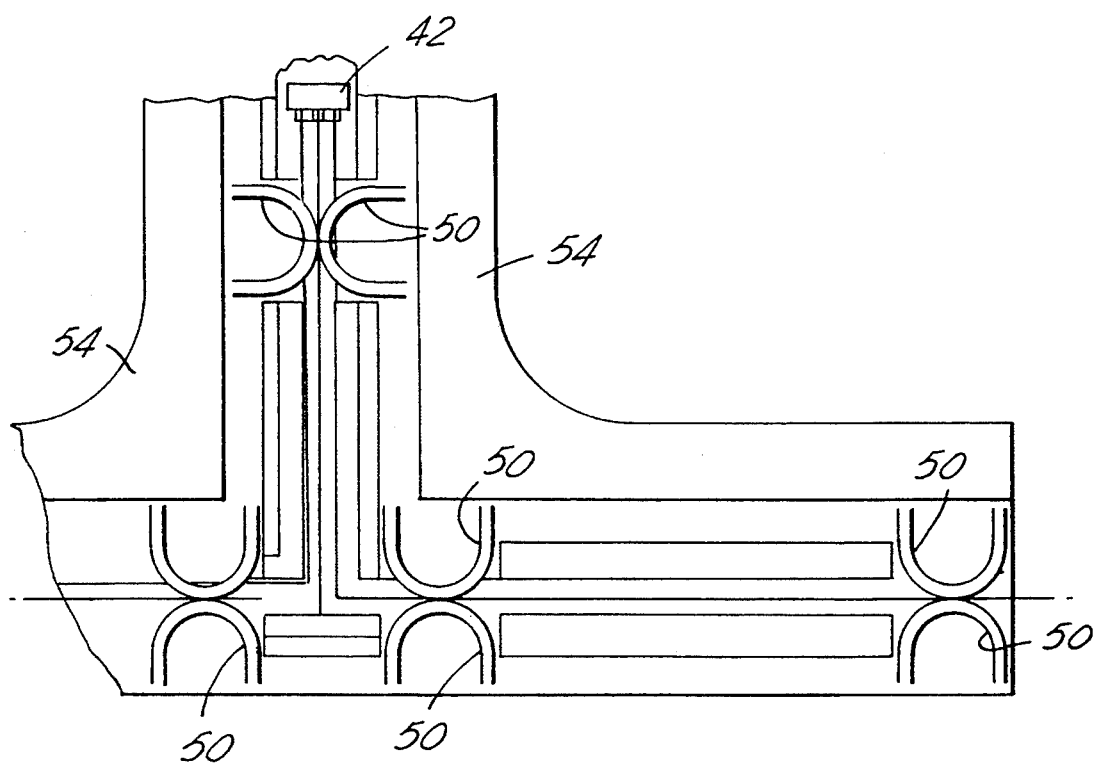
FIG. 4 is a fragmentary plan view of trough branches in accordance with the present invention.

With reference now to FIG. 4, in addition to FIGS. 2 and 3, yet another component of the restraining means is seen to comprise a pair of flexible clips 50 that are mounted over opening 34 of trough 32. The pairs of flexible clips 50 are disposed in spaced relationship to other pairs of flexible clips 50 along the extension of each trough 32. The intervals of the spaced relationship are sufficient such that clips 50 restrain wires 28 within trough 32, whether or not the wires are attached to the floor 36 of the trough 32 or restrained within the trough 32 by other means. A preferred measurement would have the pairs of flexible clips 50 spaced-apart between six and twelve inches. Additionally, the pairs of flexible clips are to be mounted before and after each branching trough or troughs 32 into another trough 32 or other troughs 32, so that pairs of flexible clips are mounted at the beginning and end of the extent of a particular trough 32.

Each pair of flexible clips 50 cantilevers from either side of trough 32, that is, at the outer most extent of a wall 38 outwardly from floor 36. Each flexible clips 50 bows out to roundedly engage an opposing clip 50. Accordingly, each clip 50 is in contact with an opposing clip 50 to provide an obstruction over opening 34, thereby restraining wires 28 beneath the opposing pair of flexible clips 50. Each flexible clip 50 may be temporarily displaced to flex its rounded portion (the portion that engages the rounded portion of an opposing clip 50) away from the opposing clip 50, so that each clip 50 is separated from the opposing flexible clip 50. Accordingly, displacement of flexible clips so that they are not in contact with one another in a paired arrangement provides opening 34 of trough 32 to allow a wire 28 to be inserted into trough 32. Clips 50 when so displaced rebound to engage one another over opening 34 of trough 32, so that the newly inserted wire 28 is retained beneath opposing clips 50. Preferably, in order to provide the characteristics of flexibility and resiliency, the flexible clips 50 are made of a low density polyethylene.

In accordance with the structure just described for the preferred embodiment of the present invention, the modified ventilation duct assembly 30 functions as a wiring board, notwithstanding its primary function as ventilation duct work for the flow of air through ducts or air chambers 52. Owing to the layout of air chambers 52, the reconfigured ventilation duct assembly 30 provides a convenient structure in which to form troughs 32 for access to the various subassembly components. Although the ventilation duct assembly 30 is reconfigured in the embodiment of the invention just described with each trough 32 having side walls 38 extending outwardly away from a surface 54 of the reconfigured ventilation duct assembly 30, the troughs 32 may be recessed into, that is, below the outer surface 54. Moreover, the side walls 38 and floor 36 that define the boundaries of trough 32 are shown as having a sharp, rectangular cross-section. The side walls 38, however, may be chamfered or rounded, and each trough 32 itself may have curved inner surfaces at the joinder of the floor 36 with side walls 38. Other modifications may be made to trough 32 to improve retention of the wires 28, to simplify manufacturing operations, or to reduce the amount of material required for construction of the structure housing the troughs 32. The troughs 32, as defined and illustrated, are intended only to form a basis for understanding the structure required to retain wires 28 in a reconfigured ventilation system in accordance with the invention.

I claim:

1. A wiring system for use on a vehicle, the vehicle of the type having an instrument panel including a plurality of electronic subassembly components, each subassembly component being electrically connected to at least one wire, the wiring system comprising:

a ventilation duct structure adapted to extend between the electronic subassembly components, said ventilation duct structure including a wall defining an air chamber for circulation of air within the vehicle, said wall of said ventilation duct structure having an external surface opposing said air chamber;

at least one trough formed on said external surface of said wall of said ventilation duct structure, said at least one trough being defined by a pair of spaced trough side walls, said at least one trough having a finite length in at least one axial direction and having an opening extending substantially along said length adapted for receiving said at least one wire, said at least one wire adapted to be connected to at least one of the electronic subassembly components; [and]

restraining means adapted for restraining said at least one wire within said at least one trough, said restraining means attached to said at least one trough; and a wire connector integrally disposed in said wall of said ventilation duct structure, said wire connector adapted for electrical contact with said at least one wire, said wire connector adapted for contact with one of the electronic subassembly components.

2. The wiring system recited in claim 1, wherein said restraining means is a restraining mechanism mounted in proximity to said at least one trough, said restraining mechanism extending over said opening to said at least one trough, said restraining mechanism at least partially enclosing said opening and being adapted to thereby restrain said at least one wire therein, said restraining mechanism being selectively movable and adapted to allow for placement of said at least one wire within said at least one trough.

3. The wiring system recited in claim 1, wherein said restraining means is an adhesive applied to said at least one wire thereby restraining said at least one wire within said at least one trough.

4. The wiring system recited in claim 1, wherein said at least one trough is adapted to be of sufficient cross-sectional area to restrain a plurality of wires of said at least one wire.

5. The wiring system recited in claim 1, wherein said at least one trough includes a plurality of branches, each said branch extending along a separate axial direction, said plurality of branches adapted for routing said at least one wire to a plurality of positions, wherein said plurality of positions are spaced from each other.

6. The wiring system recited in claim 2, wherein said restraining mechanism is at least one clip for restraining said at least one wire within said at least one trough, said clip having a first position enclosing a portion of said at least one trough to thereby restrain said at least one wire therein, and said at least one clip having a second position spaced from said first position, said at least one wire being adapted for placement in said at least one trough when said at least one clip is in said second position.

7. The wiring system recited in claim 6, wherein said at least one clip is biased in said first position.

8. The wiring system recited in claim 2, wherein said restraining mechanism is at least one flexible clip, said at least one flexible clip extending a first distance from an edge of said at least one trough to restrain said at least one wire within said at least one trough when said at least one flexible clip is in an unflexed state, and said at least one flexible clip extending a second distance from said edge of said at least one trough when said at least one flexible clip is in a flexed state, said second distance being less than said first distance, said at least one wire being placed in said at least one trough when said at least one flexible clip is in a flexed state, said at least one :flexible clip being biased towards being in an unflexed state in which state said at least one flexible clip restrains said at least one wire within said at least one trough.

9. The wiring system recited in claim 8, wherein said at least one flexible clip is formed of low density polyethylene.

10. The wiring system recited in claim 1, wherein said at least one trough includes a floor having a width, and said trough side walls extend outwardly from said floor to outer side wall edges, said trough side walls being laterally spaced from one another at a distance of said width of said floor, said opening to said at least one trough being disposed at said outer edges and opposite said floor.

11. The wiring system recited in claim 10, wherein said at least one trough includes a lip extending from an outer edge of each side wall of said side walls, said lip extending towards the opposing side wall and partially over said at least one trough.

12. The wiring system recited in claim 10, wherein said restraining means includes a first clip and a second clip, said first clip being mounted in proximity to one of said trough side walls of said at least one trough, and said second clip being mounted in proximity to the other of said trough side walls of said at least one trough, said second clip opposing said first clip, said first clip and said second clip having an unflexed state in which said first clip and said second clip extend over said opening to said at least one trough, said first clip contacting said second clip so that together said clips span said opening and are adapted to restrain said at least one wire within said at least one trough, and said first clip and said second clip being flexible to a flexed state in which said clips do not contact one another and avoid obstructing said opening and are adapted to allow said at least one wire to be placed within said at least one trough.

13. The wiring system recited in claim 12, wherein said said first clip and said second clip are biased in an unflexed state.

14. A wiring system for use on a vehicle, the vehicle of the type having an instrument panel, the wiring system comprising:

at least one wire;

a plurality of electronic subassembly components adapted to be mounted in proximity to the instrument panel, each said subassembly component being electrically connected to at least one wire;

a ductwork housing structure extending at least between said subassembly components, said ductwork housing structure including a wall defining an air chamber for circulation of air within the vehicle, said wall of said ductwork housing structure having an external surface opposing said air chamber;

at least one trough formed on said external surface of said wall of said ductwork housing structure, said at least one trough being defined by a pair of spaced trough side walls, said at least one trough having a finite length in at least one axial direction and having an opening extending substantially along said length for receiving said at least one wire connected to at least one of said subassembly components;

restraining means for restraining said at least one wire within said at least one trough said restraining means attached to said trough; and a wire connector integrally disposed in said wall of said ventilation duct structure, said wire connector receiving said at least one wire, said wire connector having electrical contact with one of said plurality of electronic subassembly components.

15. The wiring system recited in claim 14, wherein said restraining means is a restraining mechanism mounted in proximity to said at least one trough, said restraining mechanism extending over said opening to said at least one trough, said restraining mechanism at least partially enclosing said opening to thereby restrain said at least one wire therein, said restraining mechanism being selectively movable to allow for placement of said at least one wire within said at least one trough.

16. The wiring system recited in claim 14, wherein said restraining means is an adhesive applied to said at least one wire thereby restraining said at least one wire within said at least one trough.

17. The wiring system recited in claim 14, wherein said wiring system further includes a wire connector integrally disposed in said ductwork housing structure, said wire connector positioned in said at least one trough, said wire connector adapted for electrical contact with said at least one wire.

18. The wiring system recited in claim 14, wherein said at least one trough is of sufficient cross-sectional area to restrain a plurality of wires of said at least one wire.

* * * * *